(12) United States Patent
Martin

(10) Patent No.: US 11,079,609 B1
(45) Date of Patent: Aug. 3, 2021

(54) EYEGLASSES RETAINER HEADBAND

(71) Applicant: Cindy Martin, Montgomery, TX (US)

(72) Inventor: Cindy Martin, Montgomery, TX (US)

( * ) Notice: Subject to any disclaimer, the term of this patent is extended or adjusted under 35 U.S.C. 154(b) by 99 days.

(21) Appl. No.: 16/660,670

(22) Filed: Oct. 22, 2019

(51) Int. Cl.
*G02C 3/00* (2006.01)
*G02C 3/02* (2006.01)

(52) U.S. Cl.
CPC .............. *G02C 3/003* (2013.01); *G02C 3/02* (2013.01)

(58) Field of Classification Search
CPC ............ G02C 3/003; G02C 3/02; A61F 9/027
See application file for complete search history.

(56) References Cited

U.S. PATENT DOCUMENTS

| | | | | |
|---|---|---|---|---|
| 3,827,790 A | * | 8/1974 | Wenzel ................. | G02C 3/003 351/123 |
| 6,142,623 A | * | 11/2000 | Jones ..................... | G02C 3/003 351/155 |
| D669,115 S | * | 10/2012 | Kalbach ................ | G02C 3/003 D16/339 |
| 2015/0370087 A1 | * | 12/2015 | Terreri .................. | G02C 3/003 351/157 |
| 2020/0341293 A1 | * | 10/2020 | Suh ....................... | G02C 3/003 |

\* cited by examiner

*Primary Examiner* — Cara E Rakowski

(57) ABSTRACT

A headband for securing eyeglasses on the head of a wearer may include adjustable cords secured to the temple arms of the eyeglasses. Distal ends of the cords may form end loops that fit over the temple arms and movably attach the headband to the temple arms for positioning the eyeglasses on the head of the wearer to relieve any pain and pressure on the wearer's nose and ears. Slide connectors may be manipulated to position and tighten the end loops of the pair of cords about the temple arms.

9 Claims, 2 Drawing Sheets

EYEGLASSES RETAINER HEADBAND

BACKGROUND

The present invention relates to eyewear appliances, particularly to a device for securely retaining eyeglasses on the head of a wearer.

Eyeglasses typically include lenses mounted in a front frame and temple arms extending from the front frame which rest on the wearer's ears. The ends of the temple arms may loop partially about the ears and a nose bridge or nose pads may rest upon the nose of the wearer. Various devices may be found in the prior art for securing eyeglasses in place on the head of user so that they are not easily dislodged, such as, strands that attach to the rear end portions of the eyewear temple arms and extend about the back of a user's head as disclosed in U.S. Pat. No. 3,397,023 issued to Spina. U.S. Pat. No. 8,152,298 issued to Frank discloses headgear that may be used to support eyeglasses off the bridge of the nose of a person who has undergone rhinoplasty surgery.

It is an object of the present invention to provide an eyeglasses retainer headband that may secure the eyeglasses in place and may provide pressure and/or pain relief on the nose and ears of the wearer.

SUMMARY

An eyeglasses retainer headband may include a pair of cords adjustably secured to the temple arms of the eyeglasses. Distal ends of the cords may form end loops that fit over the temple arms and may be adjusted along the temple arms for positioning the eyeglasses on the head of the wearer to relieve any pain and pressure on the nose and ears of the wearer. Slide connectors may be manipulated to position and tighten the end loops of the pair of cords about the temple arms.

BRIEF DESCRIPTION OF THE DRAWINGS

So that the manner in which the above recited features, advantages and objects of the present invention are attained can be understood in detail, a more particular description of the invention briefly summarized above, may be had by reference to the embodiments thereof which are illustrated in the appended drawings.

It is noted, however, that the appended drawings illustrate only typical embodiments of this invention and are therefore not to be considered limiting of its scope, for the invention may admit to other equally effective embodiments.

DETAILED DESCRIPTION

Figure 1:
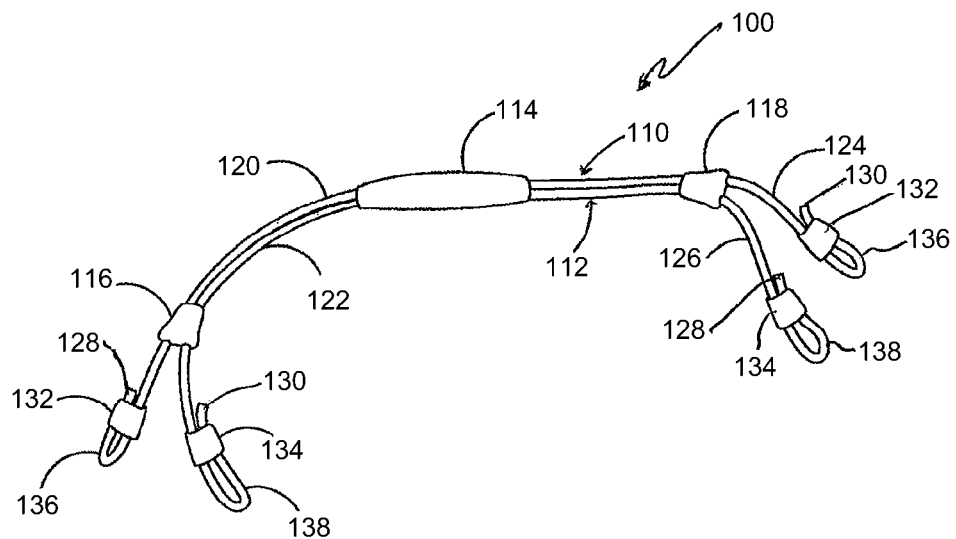
FIG. 1 is a perspective view of an eyeglasses retainer headband.
Figure 2:
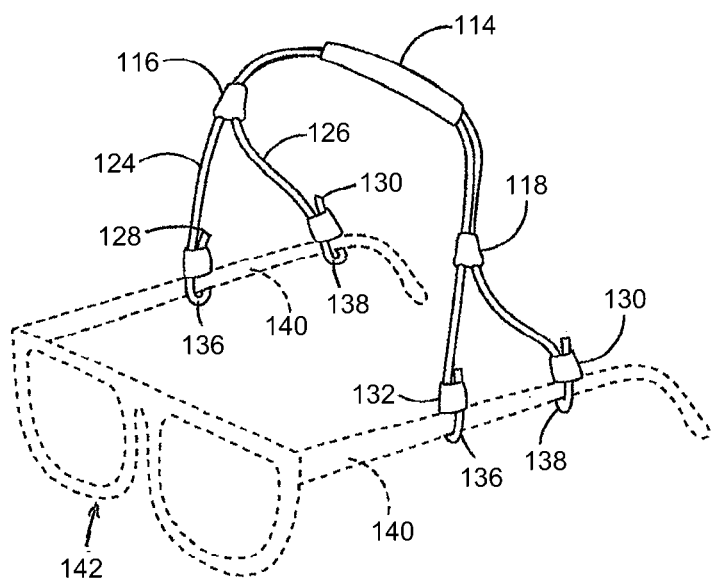
FIG. 2 is a perspective view of the eyeglasses retainer headband shown in FIG. 1 attached to a pair of eyeglasses.

Referring first to FIGS. 1 and 2, an eyeglasses retainer headband is generally identified by the reference numeral 100. The headband 100 may include cords 110 and 112 fabricated of flexible resilient material known in the art. The cords 110, 112 may be separate individual strands, however, it will be recognized that the cords 110, 112 may be joined by a webbing strip at least along a portion of the lengths thereof.

The cords 110, 112 may extend through a sleeve 114 and slide connectors 116, 118. Intermediate portions 120, 122 of the cords 110, 112, respectively, may be held relatively parallel to one another by the sleeve 114 and slide connectors 116, 118 so that the cords 110, 112 do not separate and slip apart on the head of the wearer.

Referring still to FIGS. 1 and 2, the cords 110, 112 may include end portions 124 and 126 passing through separate boreholes in the slide connectors 116, 118. The free ends 128, 130 of the end portions 124, 126 may be inserted through fasteners 132, 134. The fasteners 132, 134 may include boreholes configured to receive and frictionally grip the ends 128, 130 of the cords 110, 112 which may be inserted through one borehole of the fasteners 132, 134, looped around and inserted through the other borehole to form end loops 136, 138. The headband 100 may be secured to the eyeglasses 142 by pulling the free ends 128, 130 of the cords 110, 112 through the fastener 132, 134 to tighten the end loops 136, 138 on the temple arms 140 of the eyeglasses 142.

Figure 3:
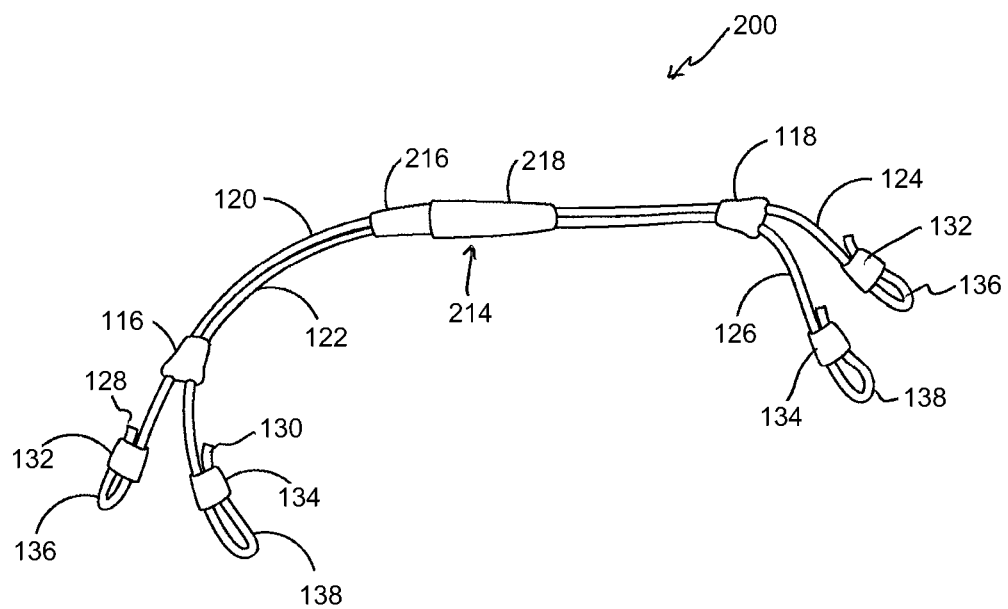
FIG. 3 is a perspective view of an alternate embodiment of an eyeglasses retainer headband.
Figure 4:
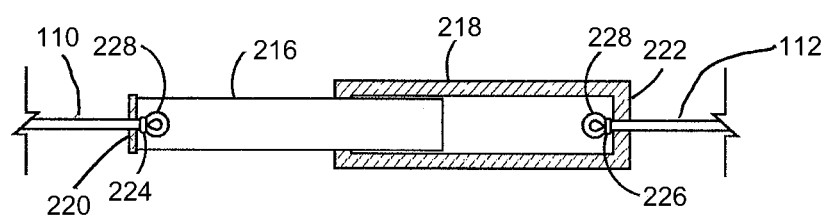
FIG. 4 is a partial section view illustrating the sleeve component of the eyeglasses retainer headband shown in FIG. 3.

Referring now to FIGS. 3 and 4, an alternate embodiment of an eyeglasses retainer headband is generally identified by the reference numeral 200. As evidenced by the use of common reference numeral, the headband 200 is similar to the headband 100 described above with the exception that the sleeve 214 comprises tubes 216 and 218. The tubes 216, 218 include elongated tubular bodies sized and arranged for one to slid within the other forming a friction connection therebetween. An end of the tubes 216, 218 may be closed by transverse end walls 220 and 222, respectively. The end walls 220, 222 may include through holes 224 and 226, respectively. Distal ends of the cords 110, 112 may be tied into knots 228 to prevent the cords 110, 112 from separating from the tubes 216, 218.

The headband 100 may be sized to fit the head of a typical wearer but may be adjusted to fit different head sizes. The length of the headband 100 may be adjusted by sliding the fasteners 132, 134 on the end portions 124, 126 of the cords 110, 112 closer to or further away from the slide connectors 116, 118, thereby shortening or lengthening the headband 100. In use, the headband 100 may be attached the temple arms 140 of the eyeglasses 142 by sliding the end loops 136, 138 over the temple arms 140. The loops 136 of the end portions 124 may be fastened on the temple arms 140 forward of the loops 138, for example but without limitation, proximate the mid-point of the temple arms 140. The loops 138 may, by way of example but without limitation, be fastened proximate the distal ends of the temple arms 140. The headband 100 may be fitted on the wearer's head and the end loops 136, 138 may be further adjusted along the temple arms 140 to comfortably secure the eyeglasses 142 on the wearer's head, and thereby alleviate any pain and pressure on the nose and ears of the wearer that may be caused by the eyeglasses 142.

While a preferred embodiment of the invention has been shown and described, other and further embodiments of the invention may be devised without departing from the basic scope thereof, and the scope thereof is determined by the claims which follow.

The invention claimed is:

1. A headband for retaining eyeglasses on a wearer's head, comprising:

a) a pair of cords, each said pair of cords including a first end portion, a second end portion and an intermediate portion;
b) a sleeve circumscribing said intermediate portion of said pair of cords;
c) a first slide connector and a second slide connector coupling a respective said first end portion and a respective said second end portion of said pair of cords; and
d) each said pair of cords including two end loops adapted for attaching said pair of cords to a temple arm of the eyeglasses.

2. The headband of claim 1 wherein said end loops are adjustable along the temple arms of the eyeglasses.

3. The headband of claim 2 wherein one of said pair of cords is removably attached proximate a mid-point of the temple arms and the other of said pair of cords is removably attached proximate a distal end of the temple arms.

4. The headband of claim 1 wherein said sleeve comprises telescoping tubular members movable relative to one another.

5. An eyeglasses headband, comprising:
a) a plurality of cords movably attached to the temple arms of the eyeglasses;
b) said plurality of cords include first free ends forming end loops adapted for attaching to the temple arms of the eyeglasses; c) a sleeve interconnecting said plurality of cords;
d) slide connectors coupling a portion of said plurality of cords in parallel alignment; and
e) said plurality of cords include second free ends forming end loops adapted for attaching to the temple arms of the eyeglasses.

6. The eyeglasses headband of claim 5 wherein said sleeve comprises telescoping tubular members movable relative to one another.

7. The eyeglasses headband of claim 5 wherein said slide connectors include boreholes adapted for frictionally engaging said plurality of cords.

8. The eyeglasses headband of claim 5 wherein said first free ends of said plurality of cords extend through a first borehole of a connector and return through a second borehole forming said end loops.

9. The eyeglasses headband of claim 5 wherein one of said pair of cords is removably attached proximate an intermediate portion of the temple arms and the other of said pair of cords is removably attached proximate a distal end of the temple arms.

* * * * *